United States Patent [19]
Miyano

[11] Patent Number: 6,081,986
[45] Date of Patent: Jul. 4, 2000

[54] AUTOMATED MACHINE TOOL INCLUDING A PLURALITY OF PROCESSING UNITS

[76] Inventor: Toshiharu Tom Miyano, c/o Miyano Machinery USA Inc., 940 N. Central Ave., Wood Dale, Ill. 60191

[21] Appl. No.: 08/759,469

[22] Filed: Dec. 5, 1996

[51] Int. Cl.[7] .............................. B23Q 7/14; B23P 23/00
[52] U.S. Cl. .......................... 29/563; 29/38 R; 29/38 A; 29/38 C; 29/564
[58] Field of Search ........................... 29/563, 564, 33 P, 29/38 P, 38 B, 38 C, 38 R, 33 J, 33 K; 409/251, 273; 82/124; 408/46

[56] References Cited

U.S. PATENT DOCUMENTS

| | | | |
|---|---|---|---|
| 1,782,138 | 11/1930 | Davis et al. | 29/38 A |
| 1,822,691 | 9/1931 | De Leeuw | 29/38 C X |
| 1,877,560 | 9/1932 | Davis | 29/38 C X |
| 1,911,304 | 5/1933 | Brown, Jr. | 29/38 C X |
| 2,346,515 | 4/1944 | Staples | 29/38 A |
| 2,543,236 | 2/1951 | Dackor et al. | 29/33 J X |
| 2,568,667 | 9/1951 | Staples | 29/38 A |
| 3,056,981 | 10/1962 | Byam | 409/221 X |
| 3,792,633 | 2/1974 | Filipiev et al. | 82/122 X |
| 3,895,424 | 7/1975 | Hautau | 82/124 X |
| 4,523,359 | 6/1985 | Gippa | 29/38 A |
| 5,031,295 | 7/1991 | Schmitt | 29/33 J |
| 5,315,750 | 5/1994 | Roseliep | 409/251 |
| 5,326,201 | 7/1994 | King | 409/273 |
| 5,347,704 | 9/1994 | Everlove | 29/564 X |
| 5,421,072 | 6/1995 | Kuban | 29/38 A |

FOREIGN PATENT DOCUMENTS

| | | | |
|---|---|---|---|
| 208180 | 3/1960 | Austria | 29/38 B |
| 48677 | 3/1982 | European Pat. Off. | 29/563 |
| 53-134141 | 6/1988 | Japan | 29/33 J |
| 1038101 | 8/1983 | U.S.S.R. | 408/46 |

*Primary Examiner*—William Briggs
*Attorney, Agent, or Firm*—Wood, Phillips, VanSanten, Clark & Mortimer

[57] ABSTRACT

An automated machine tool is provided and includes a frame having a first workpiece transfer station at a first location on the frame; at least two self-contained processing units, each of the units including structure for holding the workpiece for processing and structure for performing a process on the workpiece; and structure for sequentially indexing the processing units to the first workpiece transfer station for transferring workpieces to and from each of the processing units.

5 Claims, 5 Drawing Sheets

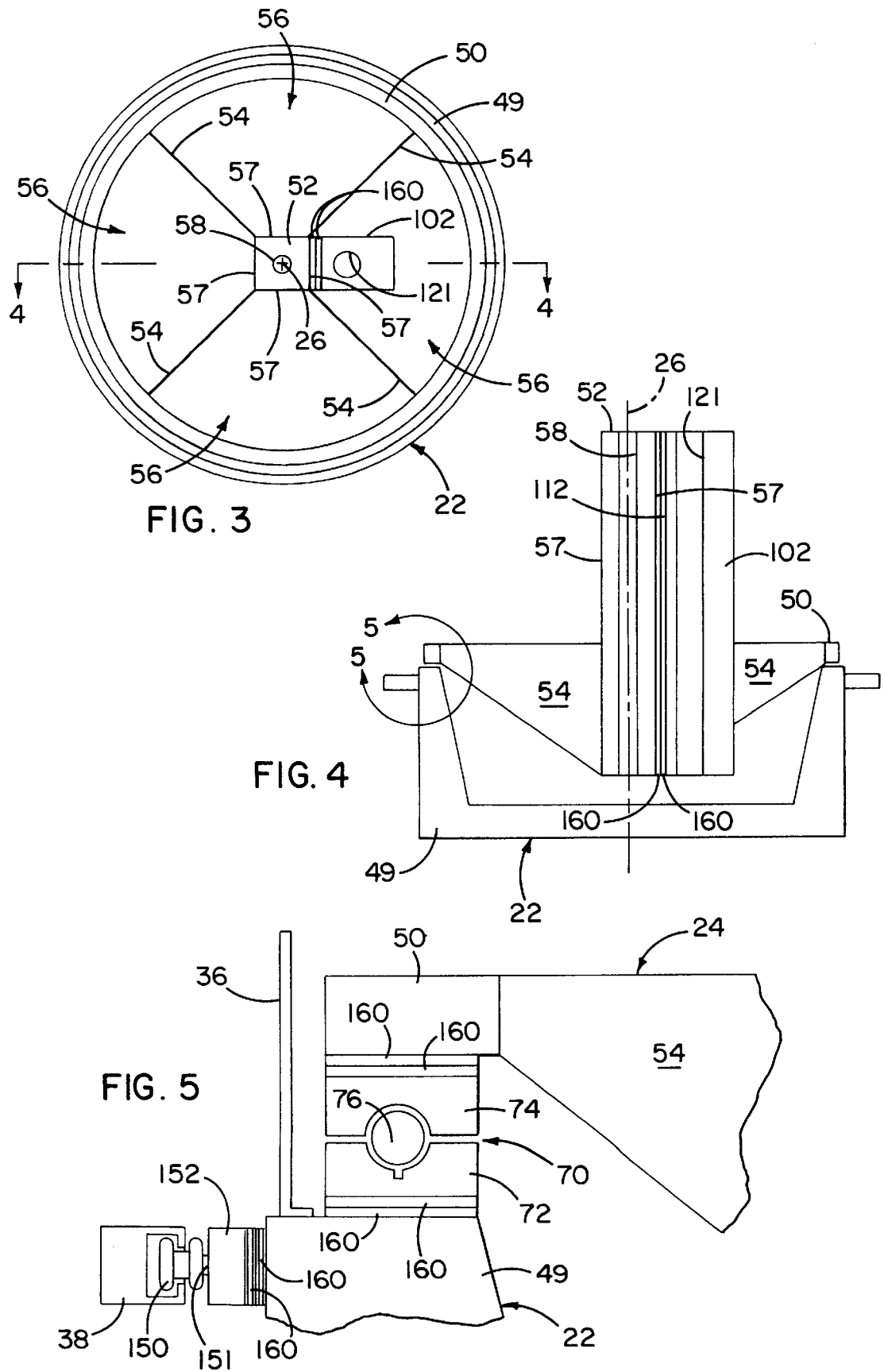

6,081,986

AUTOMATED MACHINE TOOL INCLUDING A PLURALITY OF PROCESSING UNITS

FIELD OF THE INVENTION

This invention relates to machine tools and, more particularly, to automated machine tools.

BACKGROUND OF THE INVENTION

Automated transfer machines for performing a plurality of processing functions on a workpiece are well known. Typically, such machines include a plurality of self-contained processing units or machine tools organized in a fixed array on a shop floor. Workpiece transfer devices shuttle workpieces in a predetermined sequence from processing unit to processing unit so that each processing unit performs its processing function on the workpieces, thereby resulting in a finished workpiece. The control of the workpiece transfer units and the processing units is integrated.

While such transfer machines have proven successful in providing a relatively high workpiece production rate, they tend to require a relatively large amount of floor space because each processing unit has a dedicated base and a dedicated location on the shop floor. Additionally, the workpiece transfer devices can become quite complex and expensive depending upon the overall size of the transfer machine and the size and shape of the workpiece.

SUMMARY OF THE INVENTION

In accordance with the present invention, an automated machine tool is provided and includes a frame having a first workpiece transfer station at a first location on the frame; at least two self-contained processing units, each of the units including structure for holding the workpiece for processing and structure for performing a process on a workpiece; and structure for sequentially indexing the processing units to the first workpiece transfer station for transferring workpieces to and from each of the processing units.

In one form of the invention, the structure for performing the process includes at least one of a cutting tool holder, a cutting tool spindle, a turret slide assembly, die injection mechanism, a welding mechanism, an electrical machining mechanism, a wire-cutting assembly, and a laser machining mechanism.

In one form of the invention, the structure for holding a workpiece includes at least one of a head stock assembly, a die set, a tailstock assembly, and a table slide assembly.

In one form of the invention, the structure for sequentially indexing the processing units includes a support mounted on the frame for rotation about an axis. The support carries the processing units for rotation about the axis.

In one form of the invention, the structure for sequentially indexing the processing units further includes a first toothed belt driven by a motor and a second toothed belt fixed to the support and drivably engaged with the first toothed belt.

In one form of the invention, the machine tool further includes structure for releasably mounting at least one of the processing units on the support. The structure includes a first strip of hook and loop material on the support, and a second strip of hook and loop material on at least one of the processing units. The first and second strips are sandwiched between the support and the processing unit.

In one form of the invention, the first and second strips are made from Velcro® material.

In one form of the invention, a second workpiece transfer station is provided on the frame at a second location spaced from the first location. A workpiece transfer device is provided for transferring workpieces to and from the processing units at the transfer stations. Structure is provided for moving the workpiece transfer unit between the first and second workpiece transfer stations.

In accordance with one aspect of the present invention, a method of processing a workpiece is provided and includes the steps of providing a workpiece; providing first and second self-contained processing units, with the first processing unit performing a first processing function and the second processing unit performing a second processing function; performing a first processing function on the workpiece with the first processing unit; and, after performing the first processing function with the first processing unit, repositioning the second processing unit relative to the workpiece and performing a second processing function on the workpiece using the second processing unit.

In one form of the invention, the first and second processing units each have a workpiece holder and the method further includes the steps of holding the workpiece with the workpiece holder in the first processing as the first processing function is performed, releasing the workpiece form the workpiece holder in the first processing unit after completion of the first processing function, and holding the workpiece with the workpiece holder in the second processing unit while the second processing function is performed.

In one form of the invention, the step of repositioning the second processing unit relative to the workpiece includes rotating the second processing unit about an axis.

In one form of the invention, the first process function includes at least one of machining the workpiece with a cutting tool, injection-molding the workpiece, welding the workpiece, electrical machining the workpiece, and laser machining the workpiece.

In accordance with one aspect of the present invention, a method of processing a plurality of workpieces is provided. The method includes the steps of providing first and second workpieces; providing first and second self-contained processing units, each of the processing units comprising means for holding the workpiece for processing and means for processing the workpiece; providing a transfer location for transferring workpieces to and from the first and second processing units; moving the first processing unit to the transfer location; transferring the first workpiece into the holding means of the first processing unit; initiating processing of the first workpiece by the first processing unit; moving the first processing unit from the transfer location; moving the second processing unit to the transfer location; transferring the second workpiece into the holding means of the second processing unit; and initiating processing of the second workpiece with the second processing unit.

In one form of the invention, the step of moving the first processing unit to the transfer location includes rotating the first processing unit about an axis.

In one form of the invention, the method further includes the steps of moving the second processing unit from the transfer location, returning the first processing unit to the transfer location, transferring the first workpiece from the first processing unit, moving the first processing unit from the transfer location, returning the second processing unit to the transfer location, and transferring the second workpiece from the second processing unit.

BRIEF DESCRIPTION OF THE DRAWINGS

FIG. 3 is a diagrammatic plan view showing a base, a rotatable carrier, and a processing unit platform of the machine tool shown in FIG. 1;

FIG. 4 is a cross-sectional view of the base, the carrier, and the processing unit platform taken along line 4—4 in FIG. 3;

FIG. 5 is an enlarged diagrammatic view of the area encircled by line 5—5 in FIG. 4;

DETAILED DESCRIPTION OF THE PREFERRED EMBODIMENTS

Figure 1:
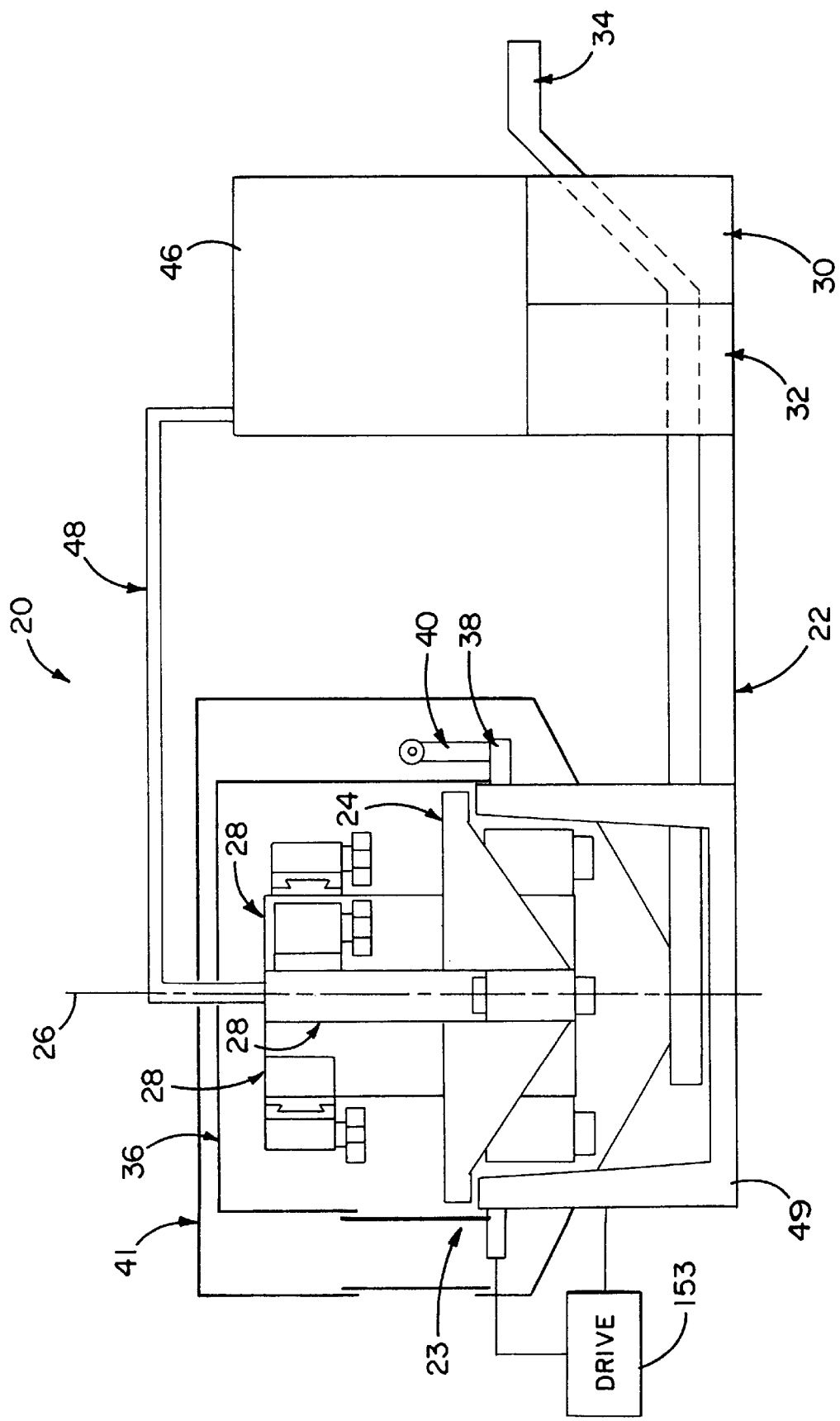
FIG. 1 is a diagrammatic elevation view shown partially in section of a machine tool embodying the present invention.
Figure 2:
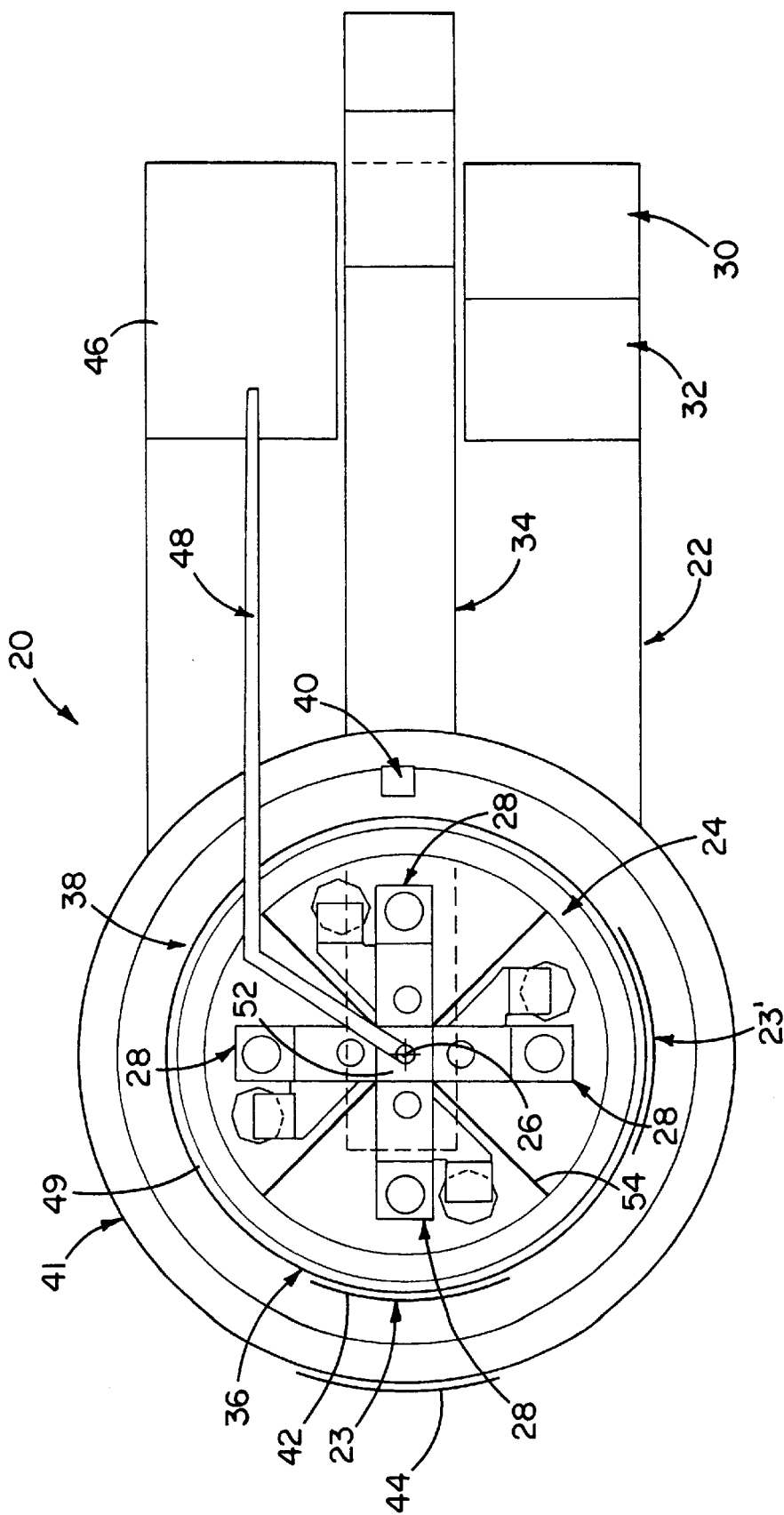
FIG. 2 is a diagrammatic plan view of the machine tool shown in FIG. 1.

FIGS. 1 and 2 show a diagrammatic illustration of an automated machine tool 20 embodying the present invention. The machine tool 20 includes a frame 22 having a workpiece transfer station 23 at a fixed location on the frame 22, a carrier 24 mounted on the frame for rotation about a vertical axis 26, and four self-contained machine tools or processing units 28 that are fixed to the carrier 24 at 90° intervals about the axis 26. The processing units 28 are mounted on the carrier 24 for rotation about the axis 26 so that each of the processing units 28 can be sequentially indexed to the workpiece transfer station 23 for transferring workpieces to and from each of the processing units 28.

The machine tool 20 further includes a coolant unit 30 for supplying cooling and cutting fluid to the processing units 28; a power supply unit 32 for supplying electric and hydraulic power to any of the components of the machine tool 20 that require electric or hydraulic power, including any of the processing units 28; a chip conveyor unit 34 for removing chips and other machining debris from the machine tool 20; a cylindrical splash guard 36 that surrounds the upper portions of the processing units 28 to form a cylindrical machining chamber; an annular-shaped carrier 38 that is mounted to the frame 22 for rotation about the axis 26; a robotic workpiece transfer device 40 that is fixed to the carrier 38 for rotation therewith about the axis 26; a cylindrical-shaped safety guard 41 mounted to the frame 22 surrounding the carrier 38 and the workpiece transfer device 40; automatic doors 42 and 44 located at the workpiece transfer station 23 to allow access to the interiors of the splash guard 36 and the safety guard 41, respectively; an integrated control unit 46 for controlling the components of the machine tool 20, including the carrier 24, the processing units 28, the cooling unit 30, the power supply 32, the chip-conveyor unit 34, the carrier 38, the workpiece transfer device 40, and the automatic doors 42,44; and a multiple conduit line 48 for transferring cutting fluid, coolant, control signals, and electric and hydraulic power between the processing units 28 and the control unit 46, the cooling unit 30 and the power supply 32.

The cooling unit 30, the power supply 32, the chip conveyor unit 34, the splash guard 36, the safety guard 41, the automatic doors 42,44, the conduit line 48, and the integrated control unit 46 are either conventional or are constructed utilizing conventional components and, accordingly, need not be described in further detail for an understanding of the invention.

As best seen in FIGS. 3 and 4, the frame 22 includes a bowl-shaped base 49 mounting the carrier 24. The carrier 24 consists of a rigid, annular outer rim 50; a vertically-extending center mast or post 52; and four ribs 54 rigidly connecting the post 52 to the rim 50. Together, the rim 50, the post 52 and the ribs 54 define four open processing areas 56 having adequate clearance to mount the processing units 28 and to allow free movement of the various components of the processing units 28 and of any workpieces carried by the processing units 28. The post 52 includes four longitudinally-extending mount surfaces 57, each of which is adapted to mount one of the processing units 28. The post 52 also includes a longitudinally-extending opening 58 to allow cutting fluid, coolant, control signals, and hydraulic and electric power to be transferred between the conduit line 46 and the processing units 28 mounted on the post 52. It should be appreciated that conventional, rotatable couplings must be provided between the conduit line 48 and the post 52 for the transfer of each of the cutting fluid, the coolant, the control signals, the hydraulic power, and the electric power. It should further be appreciated that connections must be provided between the processing units 28 and the post 52 for transferring cutting fluid, coolant, control signals, and electric and hydraulic power as required for the particular type of processing unit 28. These connections may be provided at the interface between the surface 57 and the processing unit 28.

As best seen in FIG. 5, the carrier 24 is mounted for rotation on the base 49 by an axial, deep-groove ball bearing 70 having a lower annular race 72 fixed to the base 49, an upper annular race 74 fixed to the rim 50, and a plurality of balls 76 separating the races 72 and 74, as is conventional. The bearing 70 employs conventional technology. Accordingly, a more detailed description of the bearing 70 is unnecessary for an understanding of the invention. Further, it will be appreciated that any conventional bearing construction capable of carrying the described axial loads could be employed in the invention to rotatably mount the carrier 24 to the base 49.

Figure 6:
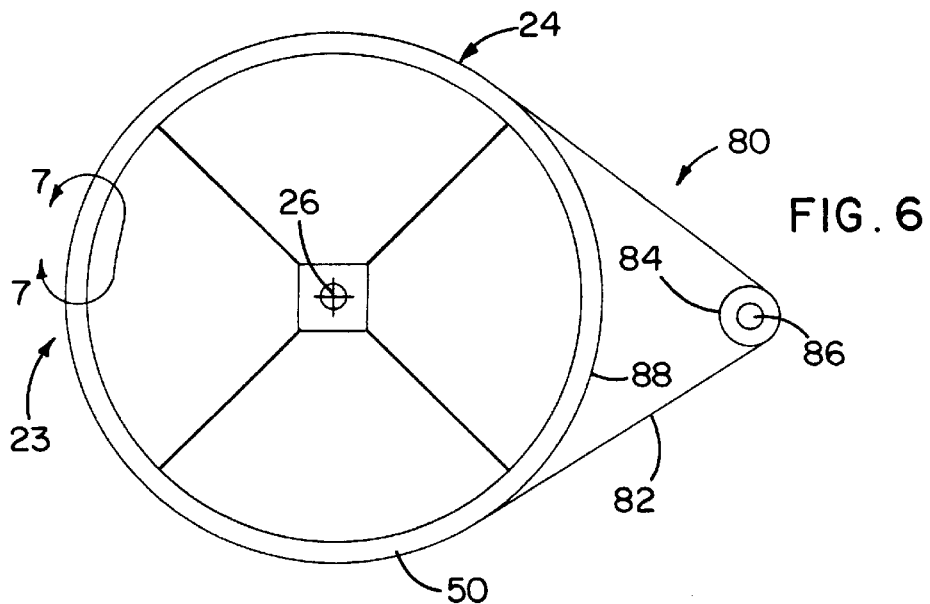
FIG. 6 is a diagrammatic plan view showing a carrier and drive assembly of the machine tool shown in FIG. 1.
Figure 7:
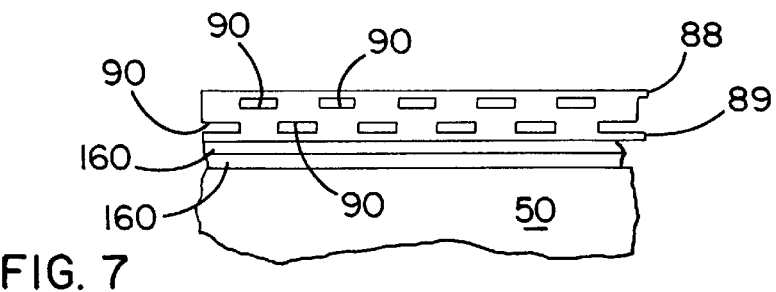
FIG. 7 is an enlarged roll-out view of the area indicated by line 7—7 in FIG. 6.
Figure 10:
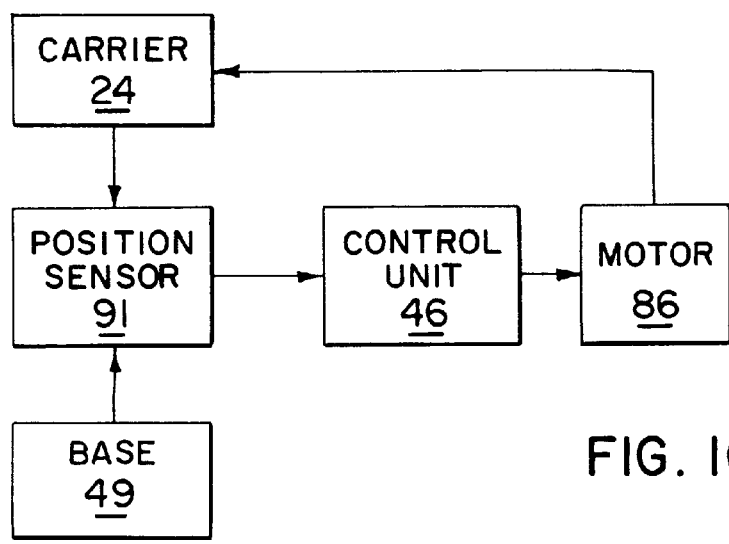
FIG. 10 is a schematic representation of a rotational indexing drive of the machine tool shown in FIG. 1.

As best seen in FIG. 6, a rotational drive assembly, shown generally at 80, is provided for rotationally-driving the carrier 24 and the processing units mounted thereon about the axis 26 and for sequentially indexing the processing units 28 to the workpiece transfer station 23. The drive assembly 80 includes an endless, toothed drive belt 82, a drive sprocket 84 for driving the belt 82, a servo motor 86 for driving the drive sprocket 84 and the belt 82, and a driven sprocket 88 mounted on the outer circumference of the rim 50 and drivably engaged with the belt 82. As best seen in FIG. 7, the driven sprocket 88 is formed from a toothed belt 89, similar to the belt 82, that has been wrapped around the outer circumference of the rim 50 and attached thereto by a suitable adhesive, thereby saving the cost of forming sprocket teeth on the outer circumference of the rim 50. The timing between the carrier 24 and the motor 86 is maintained by the meshed teeth 90 of the belt 82 and the sprockets 84,88. As shown schematically in FIG. 10, a conventional position sensor 91 is provided between the carrier 24 and the base 49 to provide a signal to the control unit 46 indicative of the rotational position of the carrier 24 relative to the base 49 and the workpiece transfer station 23. The control unit 46 utilizes the signal to control the motor 86 so that the processing units 28 are accurately indexed relative to the workpiece transfer station 23.

It should be appreciated that the details of the drive assembly 80 are shown for illustrative purposes only and that any form of conventional rotational drive and positional control system may be used to rotate and index the carrier 24 and the processing units 28. Thus, for example, the drive motor 86 could be operably engaged with the carrier 24 by a gear transmission that drives either a ring gear mounted on the rim 50 or a spur gear rotationally fixed to the post 52.

Figure 8:
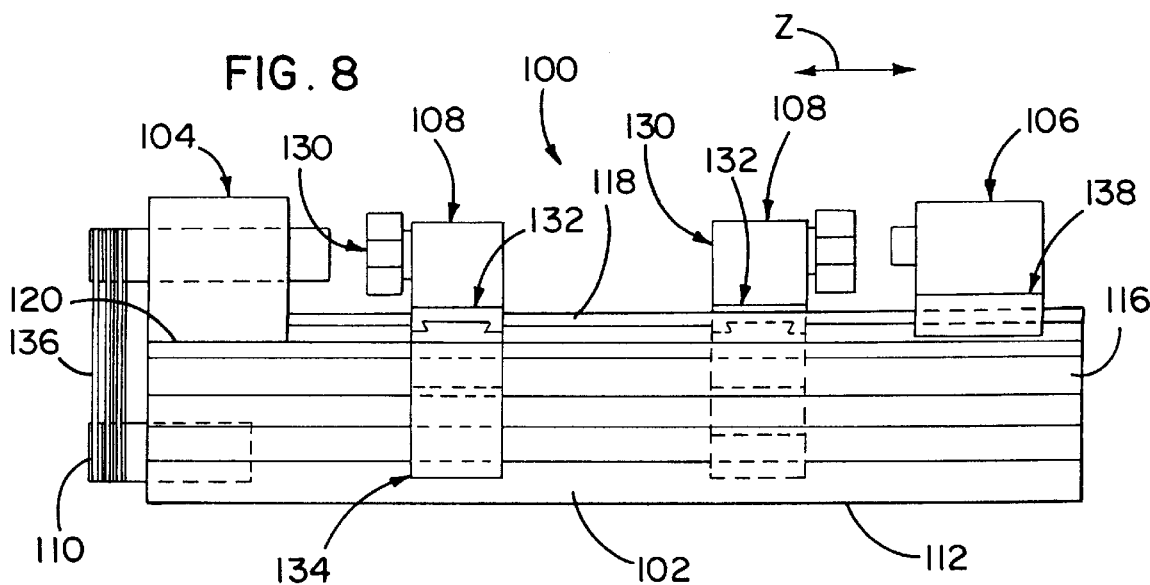
FIG. 8 is a side elevation view of a lathe processing unit embodying the present invention.
Figure 9:
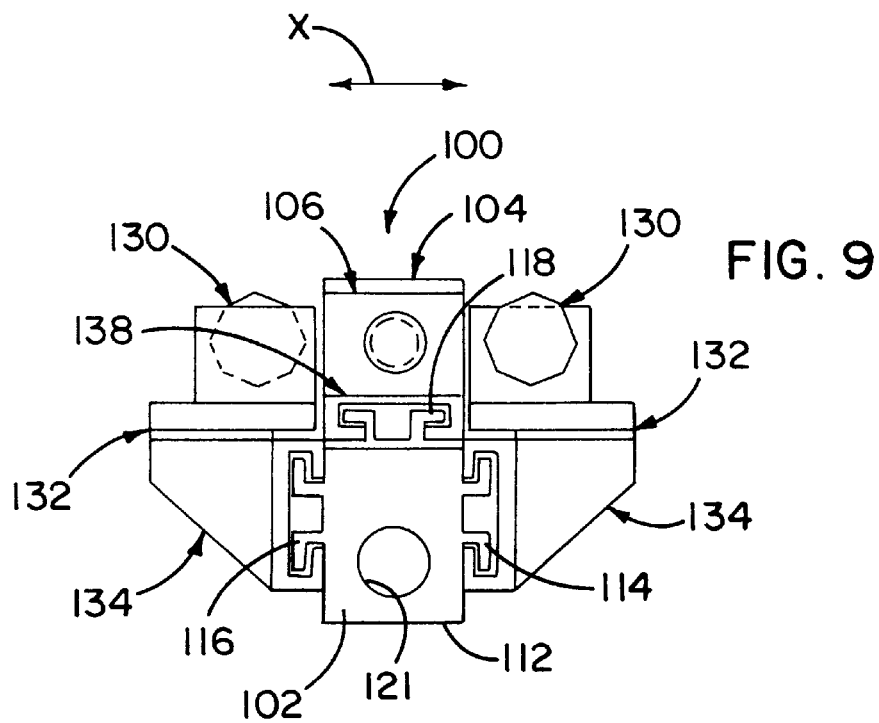
FIG. 9 is a right side elevation view of the unit shown in FIG. 8.
Figure 11:
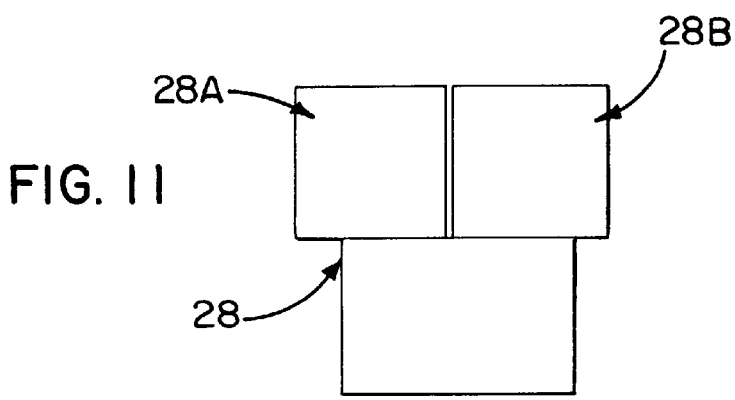
FIG. 11 is a diagrammatic view of a self-contained procuring unit of the machine tool shown in FIG. 1.

As best seen in FIGS. 8 and 9, the processing units 28 are illustrated in the form of numerically-controlled lathes 100. However, it should be appreciated that the processing units 28 may take the form of any conventional machine tool having workpiece holder 28A for holding the workpiece for processing and workpiece processor 28B for performing a process on a workpiece, as shown in FIG. 11. Such conventional machine tools include, but are not limited to, an injection molding machine, an EDM machine, an ECM machine, an EBM machine, a LBM machine, a CMM machine, a robot welding machine, a wire-cutting machine, and a laser-cutting machine. The workpiece holder 28A for holding the workpiece may include, for example, a headstock assembly, a tailstock assembly, a table slide assembly or, in the case of an injection molding machine, a die set. The workpiece processor 28B for performing a process on a workpiece may include, for example, a cutting tool holder, a cutting tool spindle, a turret slide assembly, a die injection mechanism, a welding mechanism, an electrical machining mechanism, or a laser.

It should also be appreciated that a different type of processing unit 28 may be mounted on each of the mount surfaces 57 of the post 52. Thus, a lathe 100 could be mounted on one of the surfaces 57, a robot welding machine could be mounted on another of the surfaces 57, an injection molding machine could be mounted on yet another of the surfaces 57, and a laser-cutting machine could be mounted on the last surface 57. It should also be appreciated that the various types of processing units 28 can be of a conventional construction modified to mate with the mount surfaces 57 and to operate freely within the processing areas 56.

Each lathe 100 is constructed of a number of standardized components including a base or platform 102, a main spindle or head stock assembly 104, a secondary spindle or tailstock assembly 106, two turret slide assemblies 108, and a spindle drive motor 110. The headstock assembly 104, the tailstock assembly 106, the two turret slide assemblies 108, and the spindle drive motor 110 are all controlled in a conventional manner by the control unit 48.

The platform 102 is a one-piece structure that includes a mount surface 112 adapted to mate with any of the mount surfaces 57 of the post 52, a pair of longitudinally-extending side rails 114,116 that extend over the length of the platform 102, a longitudinally-extending top rail 118 that extends partially over the length of the platform 102, and a relief surface 120 that is parallel to the surface 112 and extends partially over the length of the platform 102. The platform 102 further includes a hole 121 that extends longitudinally through the platform 102. The hole 121 serves as a mount for the motor 110 and also aids in radiating heat generated by the components of the lathe.

Each of the turret slide assemblies 108 includes a conventional tool turret and drive assembly 130, a conventional cross slide assembly 132 carrying the assembly 130 for translations along an axis X and a longitudinal slide assembly 134 carrying both of the assemblies 132 and 130 for translation along an axis Z. One of the turret slide assemblies 108 is mounted to the rail 114 by its longitudinal slide assembly 134 and the other turret slide assembly 108 is mounted to the other side rail 116 by its longitudinal slide assembly 134.

The head stock 104 is mounted to the surface 120 and is driven through belts 136 by the drive motor 110, which is mounted in the hole 121. The tailstock assembly 106 includes a longitudinal slide assembly 138. The slide assembly 138 is mounted to the top rail 118 for translating the tailstock assembly 106 along the Z axis.

It should be appreciated that the components 102, 104, 106, 108 and 110 are standardized for the lathes 100 and may be interchanged therebetween. It will also be appreciated that each lathe 100 may be customized by mounting only selected components to the platform 102.

As best seen in FIG. 5, the annular carrier 38 is mounted to the base 40 for rotation about the axis 26 by a plurality of cantilevered rollers 150 that are spaced around the outer circumference for the base 49. Each of the rollers 150 is rotatably mounted by a cantilevered shaft 151 to a bracket 152 which, in turn, is fixed to the base 49.

The carrier 38 is rotatably driven and indexed by a drive, shown schematically at 153 in FIG. 2, that is essentially identical to the drive assembly 80 for the carrier 24. Accordingly, a detailed description of the drive for the carrier 38 is not required and it should be appreciated that, similar to the carrier 24, any conventional rotational drive and positional control system may be employed to drive and index the carrier 38 about the axis 26.

Vibrational dampers, in the form of strips 160 of industrial Velcro® fasteners or other suitable hook and loop fasteners, are provided between certain strategic joints of the machine tool to isolate each of the various components of the machine tool 20 from the vibrations created by the other components of the machine tool 20. Specifically, the Velcro® fastener strips 160 are provided at the joints between the mount surfaces 57 of the post 52 and the mount surfaces 112 of the platforms 102, the rim 50 and the upper bearing race 74, the base 49 and the lower bearing race 72, and the base 49 and each of the brackets 152. The strips 160 are attached to their associated components using a suitable adhesive and the joints are clamped together using suitable fasteners. As best seen in FIG. 7, the strips 160 are also provided between the belt 89 and the rim 50 and are held in compression by a circumferential tension force in the belt 89 created by an interference fit between the belt 89 and the outer circumference of the rim 50. In addition to damping vibrations, the Velcro® fastener strips 160 assist in reinforcing the joints between the components.

It should be appreciated that the strips 160 can be eliminated from any of the joints if it is determined that the structurally-transmitted vibrations across the joint are not a concern.

The machine tool 20 is capable of a variety of modes of operation. For example, in one mode, the machine tool is configured as shown in FIGS. 1 and 2, with each of the processing units 28 being a lathe 100 with a single turret slide assembly 108, a headstock assembly 104, and a tailstock assembly 106 mounted on a platform 102. Each of the turret slide assemblies 108 carries a complement of cutting tools capable of performing all of the required lathe operations on a workpiece of a given configuration. Four workpieces are sequentially loaded into the head stocks 104 of each of the lathes 100 as each of the lathes 100 is indexed to the workpiece transfer station 23 by rotation of the post 52 by the drive assembly 80. The processing of each workpiece is begun immediately after it is loaded into the headstock 104 and, in this manner, all of the required lathe operations for four workpieces of a given configuration may be machined substantially simultaneously by the machine tool 20. After each lathe 100 finishes processing its workpiece, the lathe 100 is indexed to the workpiece transfer station 23 and the processed workpiece is removed from the head stock 104 and an unprocessed workpiece is loaded. In this manner, the machine tool 20 can continuously process a plurality of workpieces.

In another mode, the machine tool 20 is configured as set forth above with the exception that each of the slide assemblies 108 carries a complement of tools for performing a set of processing functions different from the other slide assemblies 108. In this mode, a first workpiece is loaded into the first lathe 100 after the first lathe 100 has been indexed to the work station 23. The first lathe 100 then performs a first series of processing functions on the first workpiece. Next, the first workpiece is removed from the first lathe 100 and a second workpiece is loaded into the first lathe 100. The second lathe 100 is then indexed to the work transfer station 23 and the first workpiece is loaded into the second lathe 100, which then performs the second series of processing functions on the first workpiece substantially simultaneously with the first lathe 100 performing the first series of processing functions on the second workpiece. After the first lathe 100 finishes the first series of processing functions on the second workpiece, the first lathe 100 is indexed back to the work transfer station 23 and the second workpiece is removed from the first processing unit and a third workpiece is loaded into the first lathe 100. The second lathe 100 is then indexed back to the workpiece transfer station 23 and the first workpiece is removed and replaced with the second workpiece. The third lathe 100 is then indexed to the workpiece transfer station and the first workpiece is loaded therein and the third lathe 100 performs a third series of processing functions on the first workpiece substantially simultaneously with the second lathe 100 performing the second series of processing functions on the second workpiece and the first lathe 100 performing the first series of processing functions on the third workpiece. After the first lathe 100 finishes the first series of processing functions on the third workpiece, the lathe 100 is indexed to the workpiece transfer station 23 and the third workpiece is removed therefrom and replaced with a fourth workpiece. The second lathe 100 is then indexed to the workpiece transfer station 23 and the second workpiece is removed therefrom and replaced with the third workpiece. The third lathe 100 is then indexed to the workpiece transfer station and the first workpiece is removed therefrom and replaced with the second workpiece. The fourth lathe 100 is then indexed to the workpiece transfer station and the first workpiece is loaded into the fourth lathe 100. The fourth lathe 100 then performs the fourth series of processing functions on the first workpiece substantially simultaneously with the third lathe 100 performing the third series of processing functions on the second workpiece, the second lathe 100 performing the second series of processing functions on the third workpiece, and the first lathe 100 performing the first series of processing functions on the fourth workpiece. After the first lathe 100 finishes the first series of processing functions on the fourth workpiece, the first lathe 100 is indexed to the workpiece transfer station 23 and the fourth workpiece is removed therefrom and a fifth workpiece is loaded into the lathe 100. Next, the second lathe 100 is indexed to the workpiece transfer station 23 and the third workpiece is removed therefrom and replaced by the fourth workpiece. The third lathe 100 is then indexed to the workpiece transfer station 23 and the second workpiece is removed therefrom and replaced by the third workpiece. The fourth lathe is then indexed to the workpiece transfer station 23 and the first workpiece is removed therefrom and replaced by the second workpiece. The first workpiece is now finished and removed from the machine tool 20, while the fourth lathe performs the fourth series of process functions on the second workpiece, the third lathe 100 performs the third series of process functions on the third workpiece, the second lathe 100 performs the second series of processing functions on the fourth workpiece, and the first lathe 100 performs the first series of processing functions on the fifth workpiece. In this manner, the machine tool 20 can continuously manufacture a plurality of workpieces requiring first, second, third and fourth series of processing functions. It should be appreciated that in this mode each of the lathes 100 may begin its series of processing functions on a workpiece as soon as the workpiece is loaded into the lathe 100.

It should be appreciated that the workpieces can be transferred to and from the processing units either manually or by using the workpiece transfer device 40.

As seen in FIG. 2, if increased flexibility for the machine tool 20 is desired, additional workpiece transfer stations 23 can be added to allow for the simultaneous transfer of workpieces to and from a plurality of the processing units 28. Flexibility can be further increased by adding additional workpiece transfer devices 40 onto the carrier 38.

Within this application, "self-contained processing unit" generally is intended to mean a machine tool that has all the components required to hold a workpiece and to perform the processing function of the processing unit on the workpiece. Thus, for example, in FIGS. 1 and 2, the lathes 100 are self-contained processing units 28 because each lathe 100 has a headstock 104 for holding a workpiece and at least one of the turret slide assemblies 108, for performing lathe processing on the workpiece.

It should be appreciated that the invention contemplates that more or less than four processing units 28 may be configured on the machine tool 20. Thus, for example, the carrier 24 may be configured with only two processing areas 56 and two mount surfaces 57 on the post 52. By way of further example, a carrier 24 may be configured with eight processing areas 56 and eight mount surfaces 57 on the post 52 to accommodate eight processing units 28.

It will be appreciated that by mounting a plurality of self-contained processing units on a single frame so that the processing units can be sequentially indexed to a workpiece transfer station for workpiece loading and unloading, the machine tool 20 can provide the benefits of a conventional transfer machine without requiring the floor space of a conventional transfer machine, the additional cost of dedicated bases for each processing unit, or a complex workpiece transfer device.

What is claimed is:
1. An automated machine tool comprising:
   a frame comprising a first workpiece transfer station at a first location on the frame and a second workpiece transfer station at a second location on the frame spaced from the first location;
   at least two self-contained processing units mounted on the frame for movement between the first and second workpiece transfer stations, each of the processing units capable of holding and performing a process on a workpiece;

a workpiece transfer device mounted to the frame for movement between the first and second workpiece transfer stations to transfer workpieces to and from the processing units at the transfer stations; and an annular carrier mounted to the frame for rotation about an axis, the workpiece transfer device being mounted on the carrier for rotation about the axis with the carrier between the first and second workpiece transfer stations.

2. An automated machine tool comprising:

a frame comprising a first workpiece transfer station at a first location on the frame and a second workpiece transfer station at a second location on the frame spaced from the first location;

at least two self-contained processing units mounted to the frame for movement between the first and second workpiece transfer stations for the transfer of workpieces to and from each of the processing units;

a workpiece transfer device mounted to the frame for movement between the first and second workpiece transfer stations to transfer workpieces to and from the processing units at the transfer stations;

a splash guard mounted to the frame between the processing units and the workpiece transfer device; and a safety guard mounted to the frame such that the workpiece transfer device is positioned between the safety guard and the splash shield.

3. An automated machine tool comprising:

a frame comprising a first workpiece transfer station at a first location on the frame;

at least two self-contained processing units, each capable of holding and performing a process on a workpiece;

a support mounted on the frame for rotation about an axis, said support carrying said processing units;

a motor;

a first tooth belt driven by the motor; and a second tooth belt affixed to the support and driveably engaged with the first tooth belt to rotate the support about the axis.

4. An automated machine tool comprising:

a frame comprising a first workpiece transfer station at a first location on the frame;

at least two self-contained processing units, each capable of holding and performing a process on a workpiece;

a support mounted on the frame for rotation about an axis, said support carrying said processing units, the support being movable around the axis to sequentially move the processing units to the first workpiece transfer station for the transfer of workpieces to and from each of the processing units; and a first strip of hook and loop material on said support and a second strip of hook and loop material on at least one of said processing units, said first and second strips sandwiched between said support and said at least one of said processing units and releasably mounting the at least one processing unit on said support.

5. The machine tool of claim 4 wherein said first and second strips are made from Velcro® material.

* * * * *